March 24, 1959 — C. CHRYSSANTHOU — 2,878,720
ATTACHMENT FOR MICROSCOPES
Filed June 3, 1955 — 2 Sheets-Sheet 1
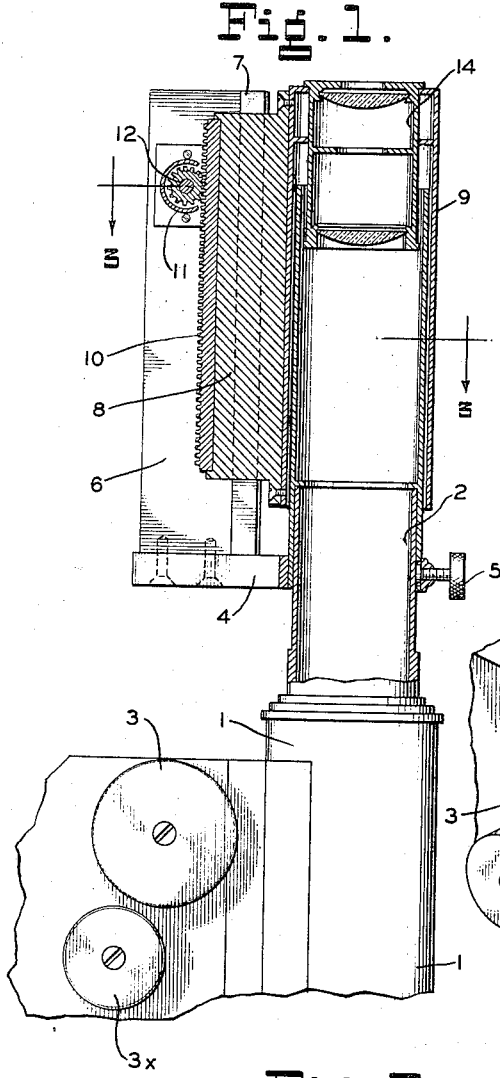
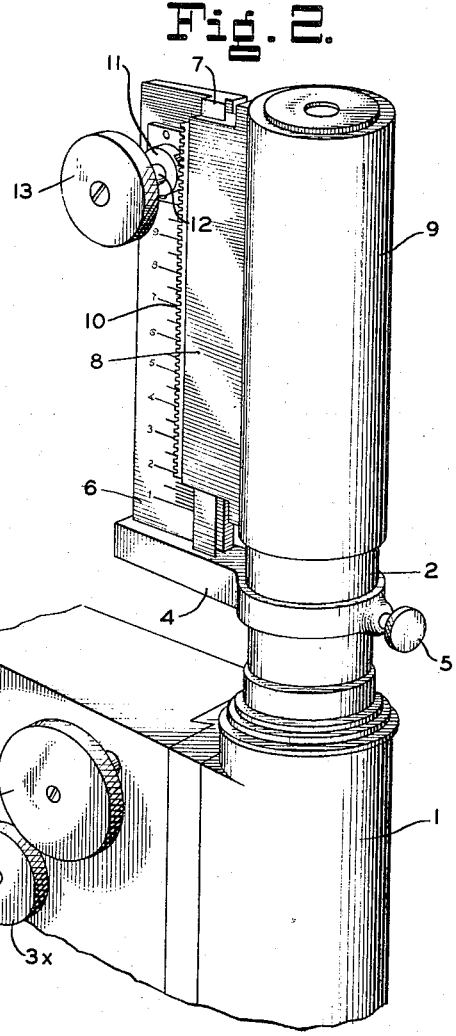
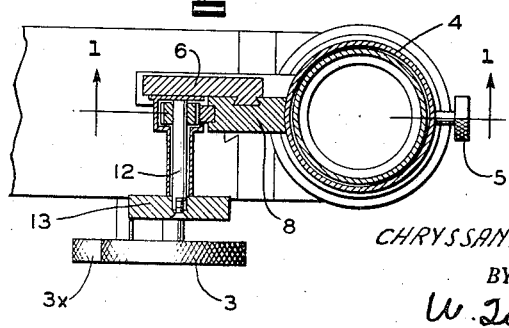
INVENTOR.
CHRYSSANTHOS CHRYSSANTHOU
BY
W. Lee Helms
ATTORNEY March 24, 1959     C. CHRYSSANTHOU     2,878,720
ATTACHMENT FOR MICROSCOPES Filed June 3, 1955     2 Sheets-Sheet 2

INVENTOR.
CHRYSSANTHOS CHRYSSANTHOU
BY
ATTORNEY

United States Patent Office 2,878,720
Patented Mar. 24, 1959

2,878,720
ATTACHMENT FOR MICROSCOPES
Chryssanthos Chryssanthou, New York, N.Y.
Application June 3, 1955, Serial No. 513,017
1 Claim. (Cl. 88—40)

The object of the present invention is to provide an attachment for microscopes by which the tube length of the microscope may be easily, quickly and accurately changed to result in higher magnification powers and successive intermediate powers.

A further object of the present invention is to provide an attachment for microscopes whereby the tube length of the microscope can be changed while the eyepiece remains in fixed position.

The invention will be described with reference to the accompanying drawings in which:

Fig. 1 is a view in elevation partly broken away showing an embodiment of the invention applied to a microscope.

Fig. 2 is a perspective view of the attachment applied to a microscope.

Fig. 3 is a transverse section on the line 3—3, Fig. 1.

Figure 4:
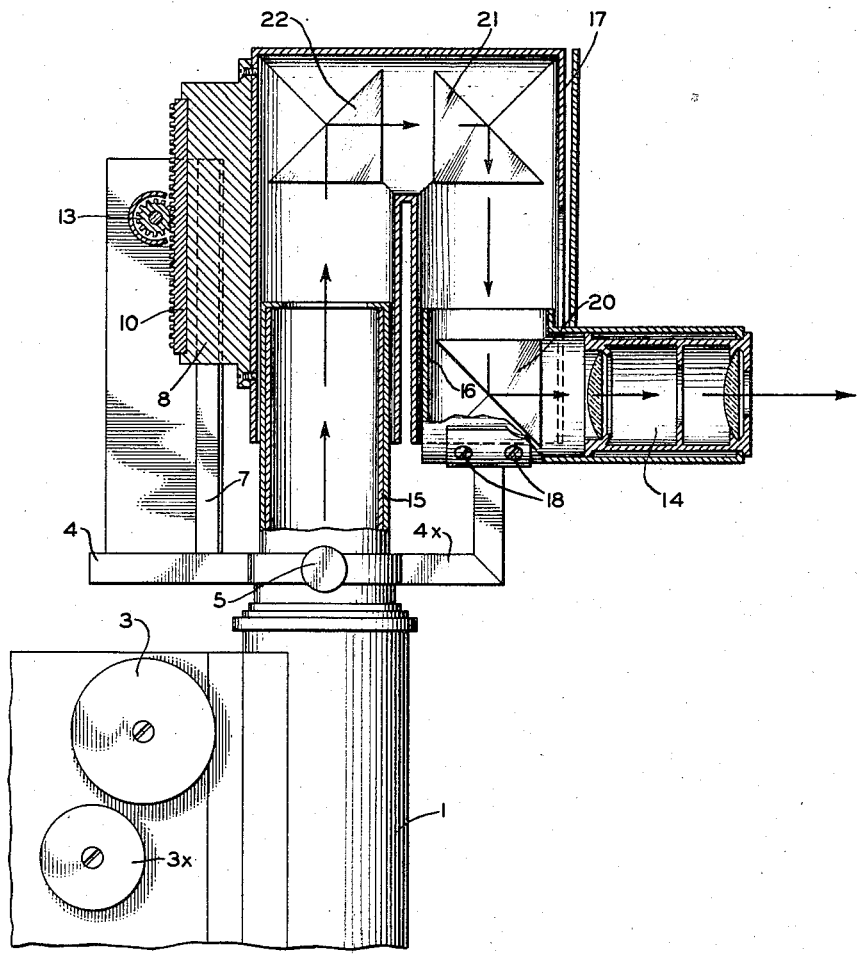
Fig. 4 is a view in elevation partly in section showing a modified form of the attachment.

Referring to Fig. 1 I have indicated at 1 a microscope having the usual adjustable tube 2 and in such microscope adjustment vertically of tube 2 is customarily effected by a coarse adjusting wheel 3 and a fine adjusting wheel 3X, these elements forming no part of the present invention.

My attachment consists of a base frame piece 4 having a collar adapted to be received upon tube 2 of a standard microscope, a set screw 5 being employed for holding the collar and frame in position. Arising from the frame is a plate 6 which carries a vertically extending dovetailed bar 7 into which is slidingly the lateral bracket 8 carried by a tube 9.

Bracket 8 carries a fine-toothed rack 10 engaged by a corresponding rack gear 11 on a shaft 12 to which is secured a thumb wheel 13.

The lowermost tooth of rack 10 is used as a pointer to indicate with relation to the numerals on plate 6, the adjustment and hence degree of magnification secured by raising and lowering tube 9.

The tube 9 is adapted to receive the tubular eye piece 14 customarily carried by tube 2 of the standard microscope. In other words in the use of my attachment the eye piece is removed from tube 2 and inserted in tube 9 of the attachment.

By rotating the thumb wheel 13 the outer tube 9 of the attachment is moved upwardly to increase the tube length of the microscope. This increase results in a higher magnification power. The tube length is variable and in each degree of adjustment will have a different magnification. Thus, by increasing or decreasing the tube length the user will have an increased or decreased magnification. The fine adjustment needed in order to have a clear picture in every setting has to be done by the two adjustment wheels 3 and 3X of the microscope. This adjustment can be made in any type of monocular microscope because the diameter of the tube is standard in all of the usual microscopes. Also to the top of the outer tube 9 can be inserted any type of eye piece.

By using different microscope objectives and eyepieces in customary manner and changing the tube length, my invention enables the attainment of variable magnification power, e.g., from 50× using a 10× objective and 5× eyepiece up to about 1500× using a 97× oil immersion objective and a 10× eyepiece, with any desired intermediate magnifications.

The above described attachment can be used, with proper adaptation, for any kind of magnifying optical instruments, when variable, intermediate or successive magnifications are desired.

In Fig. 4 is shown a modified attachment which has special utility in that the eye piece is not changed in its position during adjustment of the attachment. It consists of two inner tubes 15 and 16, and an outer assembly tube 17 of an inverted U-shape. The left hand leg of the tube assembly carries the same members for adjustment as indicated at 8, 10, 12 and 13 in Figs. 1 and 2 and the same numerals are employed in Fig. 4. Likewise the member 8 will be dovetailed in its supporting bracket frame, having the set screw 5 as in said Figs. 1 and 2. A collar 4, however, is provided with an extension 4X which is secured by the screws 18 to innertube 16 of the assembly. Thus, the tubes 15 and 16 are fixed. There are three rectangular prisms in order to reflect the light rays and bring them to the eye piece, these prisms being shown at 20, 21 and 22. The reflection is of 90°. Moving the outer tube assembly upwardly or downwardly will change again the tube length of the microscope. This change results in increase or decrease of the magnification, whilst the position of the eye piece 14 is unchanged.

Having described my invention, what I desire and hope to secure by the issue of Letters Patent is as follows:

In an attachment for microscopes, a frame member having a collar adapted to be received upon the ocular end of a microscope tube, a first tube projected upwardly from said collar and adapted to be received at its lower end upon the said ocular end of a microscope tube, a second, L-shaped tube carried by an extension of said collar and adapted to receive the eye piece of a microscope at the outer end of its horizontal leg, an inverted U-shaped tube assembly having one tube thereof adapted to be received upon said upwardly projected first tube, and the other tube thereof adapted to be received upon the perpendicular leg of said L-shaped second tube, a rack-carrying member received upon said one tube of the inverted U-shaped tube assembly, means slidably securing the rack-carrying member to said frame member, a fine toothed gear engaging the rack of said rack-carrying member whereby the inverted U-shaped tube assembly may be vertically adjusted, and three rectangular prisms adapted to direct an image from a microscope respectively through said U-shaped and L-shaped tubes and thence through the lenses of an eye piece held in the said outer end of the horizontal leg of said L-shaped tube.

References Cited in the file of this patent

UNITED STATES PATENTS 2,522,493     Bailly _____ Sept. 19, 1950
2,600,090     Leitz et al. _____ Nov. 24, 1953